US006546993B1

(12) United States Patent
Tilch

(10) Patent No.: US 6,546,993 B1
(45) Date of Patent: Apr. 15, 2003

(54) METHOD FOR PRODUCING A BOX PISTON

(75) Inventor: Peter Tilch, Ölbronn-Dürrn (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 09/979,592

(22) PCT Filed: May 21, 2000

(86) PCT No.: PCT/DE00/00921

§ 371 (c)(1), (2), (4) Date: Nov. 16, 2001

(87) PCT Pub. No.: WO00/72116

PCT Pub. Date: Nov. 30, 2000

(30) Foreign Application Priority Data

May 19, 1999 (DE) .......................................... 199 22 809

(51) Int. Cl.[7] ........................ B22D 33/04; B22D 17/24; B23P 15/10

(52) U.S. Cl. ....................... 164/132; 164/137; 164/345; 29/888.04

(58) Field of Search ................................ 164/131, 132, 164/137, 345, 346; 29/888.04, 888.049; 123/193.6

(56) References Cited

U.S. PATENT DOCUMENTS

| | | | | | |
|---|---|---|---|---|---|
| 1,803,301 | A | | 4/1931 | Fahlman | |
| 5,058,489 | A | | 10/1991 | Iwaya | |
| 5,285,840 | A | * | 2/1994 | Hayashi et al. | 164/132 |
| 5,311,918 | A | * | 5/1994 | Scott | 164/63 |
| 5,809,962 | A | * | 9/1998 | Abbott et al. | 123/193.6 |
| 5,924,472 | A | * | 7/1999 | Suzuki et al. | 164/137 |

FOREIGN PATENT DOCUMENTS

| | | |
|---|---|---|
| DE | 26 22 595 | 12/1976 |
| DE | 197 46 102 | 4/1999 |
| DE | 198 13 745 | 4/1999 |
| EP | 0 605 910 | 7/1994 |

* cited by examiner

*Primary Examiner*—M. Alexandra Elve
*Assistant Examiner*—Kevin McHenry
(74) *Attorney, Agent, or Firm*—Collard & Roe, P.C.

(57) ABSTRACT

The invention relates to a casting method for producing a box piston which comprises recesses between the hub support and the ring band. The invention aims to further reduce the weight of the piston. The casting cores which produce the recesses can therefore be pivoted during stripping.

4 Claims, 2 Drawing Sheets

METHOD FOR PRODUCING A BOX PISTON

CROSS REFERENCE TO RELATED APPLICATIONS

Applicant claims priority under 35 U.S.C. §119 of German Application No. 199 22 809.4, filed on May 19, 1999. Applicant also claims priority under 35 U.S.C. §120 of PCT/DE00/00921, filed on Mar. 21, 2000. The international application under PCT article 21(2) was not published in English.

The invention relates to a method for producing a box piston.

Box piston are understood in this connection to be pistons which, below an about circular-cylindrical area receiving the piston rings, have a through-extending outer contour that highly deviates from the circular shape in that the hubs and the walls of the box are recessed toward the center axis of the piston, and that defined supporting sections of the shaft wall are still present only in the zone of the pressure and counter-pressure sides, such sections being determined by the piston diameter.

Such a piston is known from U.S. Pat. No. 5,058,489. Such a piston is normally produced by casting an aluminum alloy in a metal mold. The recess or high casting between the hub support and the ring band (compare FIG. 2 of said patent) is produced in this connection by linearly displaceable core parts. Conditioned by the purely linear displacement of the core, the shaping of the recesses and thus also the possible weight reduction of the piston are subject to limitations.

Therefore, the invention is dealing with the problem of permitting in connection with box pistons with recesses between the ring band and the hub support, variable shaping of the recesses, and of producing in a simple manner defined features of the shape in the area of the wall of the box, if necessary.

Said problem is solved by the method according to the invention. Advantageous further developments are the object of further embodiments.

The axial direction is to be understood in this connection to be the direction of the longitudinal axis of the piston, and the radial direction is a direction extending perpendicular to the longitudinal axis.

Owing to the fact that the casting cores producing the recesses can be pivoted, it is possible to produce undercuts especially in the area behind the ring grooves without having to divide the cores as it was required until now for that purpose in connection with pistons.

The casting core producing the recess may, in this connection, form one piece with the window insert of the casting mold; the casting core may be connectable with the window insert; or the window insert and the casting core producing the recess are capable of pivoting independently of one another; or the window insert is displaceable only linearly. The window insert is to be understood as being the part of the mold that shapes the piston especially in the area of the outwardly pointing box wall and the adjacent hubs.

Furthermore, by suitably selecting the pivot point and the draw-in angle, it is made possible—if weight-reducing breakthroughs have to be produced in the walls of the box as well—to produce such breakthroughs without using spindle sleeves by producing the rounding radii at least in the upper outer area of the breakthroughs with pivoting window inserts as well.

As with linearly displaceable casting cores, for stripping the cast part without problems, provision has to be made for a draw-in gradient or draw-in angle depending on the pivot point of the casting core. As opposed to the known casting cores, the position of such angle varies, and its size may vary locally as well.

The invention is explained in greater detail in the following with the help of an exemplified embodiment. In the drawing, FIG. 1 shows a cast box piston with a pivoting casting core.

Figure 1:
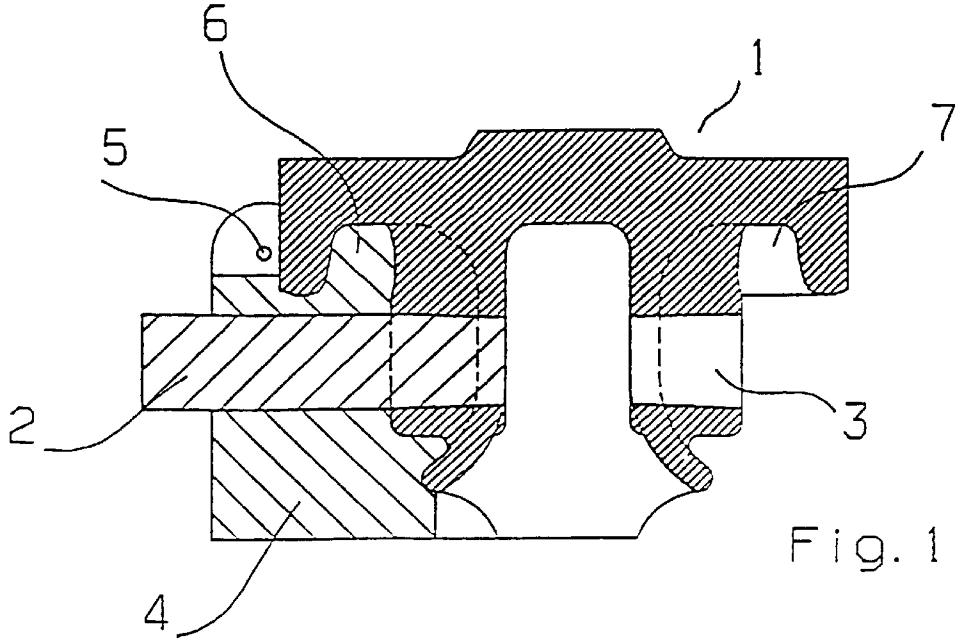

After the piston 1 has been cast, the spindle sleeves producing the openings 3 in the zone of the gudgeon pin boss are pulled first during stripping. Only after the spindle sleeve 2 has been completely pulled from the pivoting window part 4, the latter can be folded down sideways by pivoting around the pivot point 5, and stripped. The mold, which is not shown, can be subsequently driven up. The casting cores 6 for producing the recesses 7 are integral components of the pivoting window or mold parts 4 and joined with the latter as one piece.

Figure 2:
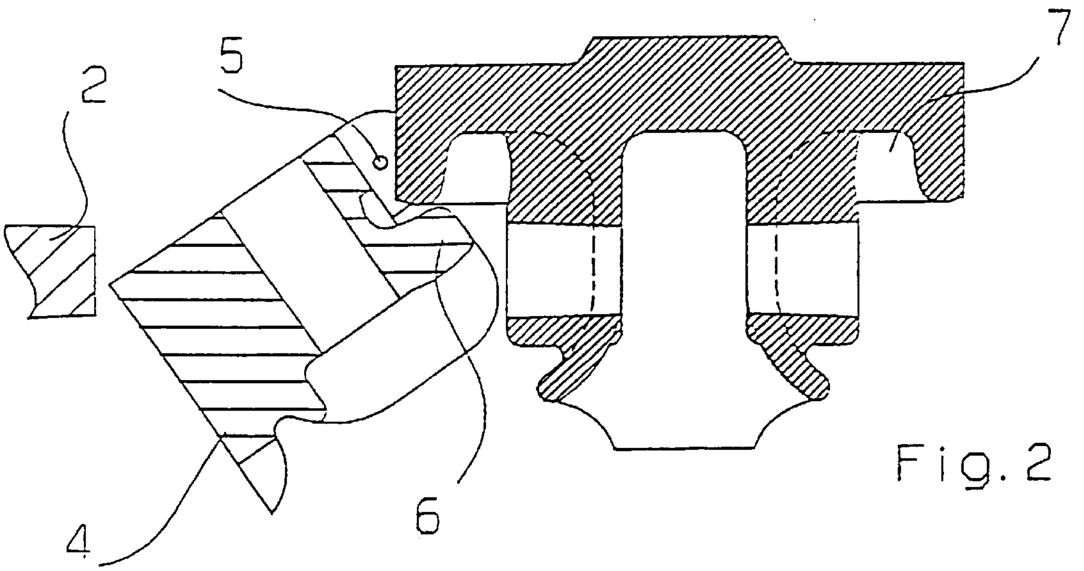
FIG. 2 shows the stripping of the pivoting core.

The unshaded curved area of the window part 4 visible in FIG. 2 illustrates that the recess 7 may extend over a larger circumferential angle of the piston, even in excess of 90°.

Figure 3:
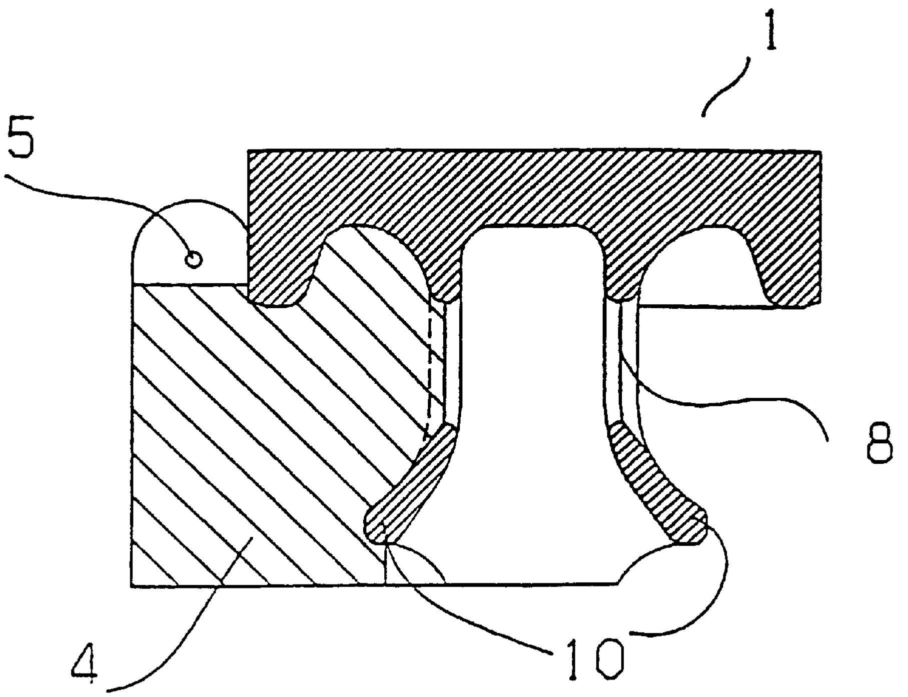
FIG. 3 shows a section extending in the direction of the pin next to the pin hubs.
Figure 4:
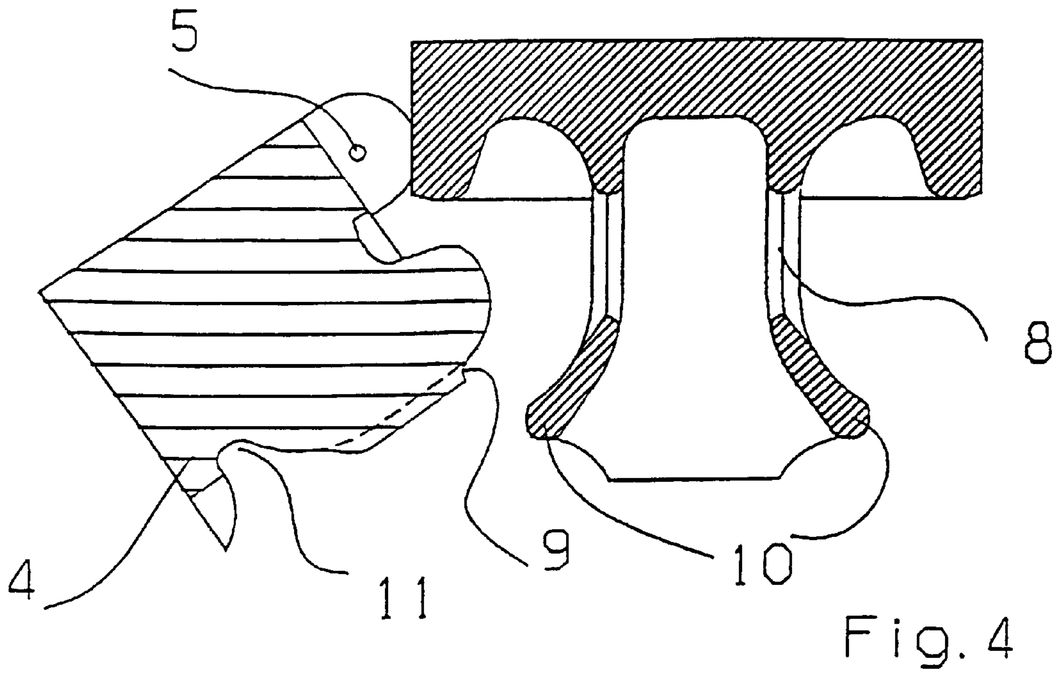
FIG. 4, as FIG. 3, shows the casting core pivoted.

FIG. 3 shows that it is possible also with the pivoting window parts 4 to produce rounding radii on the breakthroughs 8 with the corresponding contours 9 on the window part 4. Furthermore, it is possible with the pivoting window parts 4 to produce on the lower end of the box wall a reinforcing collar 10 with the corresponding contours 11 of the pivoting window part 4.

What is claimed is:

1. A method for producing a box piston (1) comprising an upper, about circular-cylindrical area for receiving at least two ring grooves, and a lower area containing hubs, the hubs being recessed in a direction of an axis of a gudgeon toward a longitudinal axis of the piston, and comprising recesses (7), the recesses being present in a peripheral direction at least in a zone in front of the hubs; and disposed in an axial direction at a level of the circular-cylindrical area and in a radial direction between a hub support and the circular-cylindrical area characterized in that the recesses (7) are produced by casting cores (6) pivoting during stripping.

2. The method for producing a box piston (1) according to claim 1, characterized in that the pivoting casting core (6) is forming one piece with a window insert (4), whereby the window insert (4) has a bore for receiving a separately strippable spindle sleeve (2), and whereby the spindle sleeve (2) produces in a course of casting of the piston (1) a breakthrough (3) for a hub bore.

3. The method for producing a box piston according to claim 2 with breakthroughs (8) in connection walls between the hubs and supporting shaft wall sections, characterized in that the window insert (4) has contours (9) producing rounding radii in an area of the breakthroughs (8).

4. The method for producing a box piston according to claim 2, characterized in that the window insert (4) has a contour (11) producing a reinforcing collar (10) below a box wall and the hub.

* * * * *

UNITED STATES PATENT AND TRADEMARK OFFICE

CERTIFICATE OF CORRECTION

PATENT NO. : 6,546,993 B1
DATED : April 15, 2003
INVENTOR(S) : Peter Tilch

It is certified that error appears in the above-identified patent and that said Letters Patent is hereby corrected as shown below:

Title page,
Item [22], the PCT filing date should read:
-- March 21, 2000 --

Signed and Sealed this

Ninth Day of September, 2003

JAMES E. ROGAN
*Director of the United States Patent and Trademark Office*